(12) United States Patent
Khalil et al.

(10) Patent No.: US 10,324,207 B2
(45) Date of Patent: Jun. 18, 2019

(54) SEISMIC DATA LEAST-SQUARE MIGRATION METHOD AND DEVICE

(71) Applicant: CGG SERVICES SA, Massy (FR)

(72) Inventors: Adel Khalil, Aberdeen (GB); Henning Hoeber, East Grinstead (GB); Jeshurun Hembd, Rosharon, TX (US); Adriano Gomes, Houston, TX (US); Gordon Poole, East Grinstead (GB); Francesco Perrone, Crawley (GB); Lorenzo Casasanta, Calgary (CA); Graham Roberts, Forest Row (GB); Andrew Ratcliffe, Forest Row (GB)

(73) Assignee: CGG SERVICES SAS, Massy (FR)

( * ) Notice: Subject to any disclaimer, the term of this patent is extended or adjusted under 35 U.S.C. 154(b) by 84 days.

(21) Appl. No.: 15/337,561

(22) Filed: Oct. 28, 2016

(65) Prior Publication Data

US 2017/0123090 A1    May 4, 2017

Related U.S. Application Data

(60) Provisional application No. 62/308,890, filed on Mar. 16, 2016, provisional application No. 62/249,404, filed on Nov. 2, 2015.

(51) Int. Cl.
*G01V 1/34* (2006.01)
*G01V 1/28* (2006.01)
(Continued)

(52) U.S. Cl.
CPC .............. *G01V 1/345* (2013.01); *G01V 1/282* (2013.01); *G01V 1/301* (2013.01); *G01V 1/325* (2013.01);
(Continued)

(58) Field of Classification Search
None
See application file for complete search history.

(56) References Cited

U.S. PATENT DOCUMENTS

| 2004/0174770 A1* | 9/2004 | Rees | G01N 29/07 367/7 |
| 2012/0051179 A1* | 3/2012 | Shin | G01V 1/28 367/50 |
| 2013/0116926 A1* | 5/2013 | Rodney | G01V 1/42 702/8 |

OTHER PUBLICATIONS

Mandi H. Al Mutlaq, University of Calgary, Surface-consistent matching filters for time-lapse processing, Department of Geoscience Calgary, Alberta, Aug. 2013, 164 pages.*

(Continued)

*Primary Examiner* — Tung S Lau
(74) *Attorney, Agent, or Firm* — Patent Portfolio Builders PLLC

(57) ABSTRACT

Computing device, computer instructions and method for calculating an image of a subsurface based on least square migration and image de-convolution using a matching operator F. The method includes receiving seismic data d; computing a first image m of the subsurface based on the seismic data d; computing a second image h of the subsurface based on the first image m; applying a transform operation to the first and second images m and h to obtain a first transform of the first image and a second transform of the second image; calculating the matching operator F by matching the first transform of the first image to the second transform of the second image; and generating an updated image $m^{updated}$ of the subsurface based on the matching operator F and the first transform of the first image.

20 Claims, 9 Drawing Sheets

(51) Int. Cl.
  *G01V 1/36* (2006.01)
  *G01V 1/32* (2006.01)
  *G01V 1/30* (2006.01)
(52) U.S. Cl.
  CPC .............. *G01V 1/362* (2013.01); *G01V 1/364* (2013.01); *G01V 2210/51* (2013.01); *G01V 2210/512* (2013.01)

(56) References Cited

OTHER PUBLICATIONS

E. Baysal et al., "Reverse Time Migration", Geophysics, Nov. 1983, vol. 48, No. 11, pp. 1514-1524.
E.J. Candès et al., "Curvelets—A Surprisingly Effective Nonadaptive Representation for Objects with Edges", Saint-Malo Proceedings, 1999, Vanderbilt University Press, Nashville (2000), pp. 105-120.
E.J. Candès, "Ridgelets: Theory and Applications", Technical Report No. 1998-17, Department of Statistics, Stanford University, Sep. 1998.
J. Claerbout et al., "Spectral Preconditioning", Stanford Exploration Project, Report 82, May 11, 2011, pp. 1-187.
A. Guitton, "Amplitude and Kinematic Corrections of Migrated Images for Nonunitary Imaging Operators", Geophysics, Jul.-Aug. 2004, vol. 69, No. 4, pp. 1017-1024.
D. Hale et al., "A Method for Estimating Apparent Displacement Vectors from Time-Lapse Seismic Images", SEG Annual Meeting 2007, San Antonio, Texas, SEG Expanded Technical Abstracts, pp. 2939-2943.
C.H. Hemon, "Equations D'Onde et Modeles", "Wave Equations and Models", Geophysical Prospecting, 1978, vol. 26, pp. 790-821.
F. Matúš et al., "Image Representations via a Finite Radon Transform", IEEE Transactions on Pattern Analysis and Machine Intelligence, Oct. 1993, vol. 15, No. 10, pp. 996-1006.
G.A. McMechan, "Migration by Extrapolation of Time-Dependent Boundary Values", Geophysical Prospecting, 1983, vol. 31, pp. 413-420.
G. Poole, "Pre-Migration Receiver -De-Ghosting and Re-Datuming for Variable Depth Streamer Data", SEG Annual Meeting 2013, Houston, Texas, SEG Expanded Technical Abstracts, pp. 4216-4220.
J.E. Rickett, "Illumination-Based Normalization for Wave-Equation Depth Migration", Geophysics, Jul.-Aug. 2003, vol. 68, No. 4, pp. 1371-1379.
W.A. Schneider, "Integral Formulation for Migration in Two and Three Dimensions", Geophysics, Feb. 1978, vol. 43, No. 1, pp. 49-76.
N.D. Whitmore, "Iterative Depth Migration by Backward Time Propagation", SEG 53rd Annual International Meeting, SEG Expanded Technical Abstracts, pp. 382-385.
X. Wu et al., "High-Fidelity Adaptive Curvelet Domain Primary-Multiple Separation", First Break, Jan. 2015, vol. 33, pp. 53-59, EAGE.
G. Yao et al., "Least-Squares Reverse-Time Migration", SEG Annual Meeting 2012, Las Vegas, Nevada, SEG Expanded Technical Abstracts.
W. Dai et al., "Least-Squares Migration of Multisource Data with a Deblurring Filter", Geophysics, Sep.-Oct. 2011, vol. 76, No. 5, pp. R135-R146.
Extended European Search Report in corresponding European Application No. EP16 30 6399 dated Mar. 21, 2017.
F. Hermann, et al.; Curvelet-based seismic data processing: A multiscale and nonlinear approach:; Geophysics, vol. 73, No. 1; Jul. 6, 2007; pp. A1-A5.
D. Donno; "Improving multiple removal using least-squares dip filters and independent component analysis"; Geophysics, vol. 76, No. 5; Sep. 2011; pp. V91-V104.
U. Theune, et al.; "Least-squares local Radon transforms for dip-dependent GPR image decomposition"; Journal of Applied Physics, vol. 59, No. 3; Jul. 2006; pp. 224-235.
W. W. Symes, et al.; "Approximate linearized inversion by optimal scaling of prestack depth migration"; Geophysics, vol. 73, No. 2; Mar. 2008; pp. R23-R35.
S. Dong, et al.; "Least-squares reverse time migration: towards true amplitude imaging and improving the resolution"; SEG Technical Program Expanded Abstracts; SEG Las Vegas 2012 Annual Meeting; Sep. 2012; pp. 1-5.

\* cited by examiner

SEISMIC DATA LEAST-SQUARE MIGRATION METHOD AND DEVICE

CROSS-REFERENCE TO RELATED APPLICATIONS

The present application is related to and claims the benefit of priority from U.S. Provisional Application Nos. 62/249,404, filed Nov. 2, 2015, entitled "Least square migration and image de-convolution using matching filters," and 62/308,890, filed Mar. 16, 2016, entitled "Least squares migration using complete and unique data-space event separation," the entire contents of which are incorporated herein by reference.

BACKGROUND

Technical Field

Embodiments of the subject matter disclosed herein generally relate to methods and systems and, more particularly, to mechanisms and techniques for identifying subsurface structures based on recorded seismic data.

DISCUSSION OF THE BACKGROUND

Seismic data is acquired to generate a profile (image) of the geophysical structure (subsurface) under the surface. While this profile does not provide an accurate location for oil and gas reservoirs, it suggests, to those trained in the field, the presence or absence of the oil and/or gas reservoirs. Thus, providing a high-resolution image of the subsurface is an ongoing process for the exploration of natural resources.

The seismic data may be acquired in various ways, for example, with land equipment, marine equipment, ocean bottom equipment, autonomous underwater equipment, or aerial equipment. The type of sensors and sources used in any of these scenarios are known in the art and thus, not repeated herein.

After the seismic data is acquired, it needs to be processed to eventually generate the image of the subsurface. There are many known algorithms for processing the seismic data. Migration is one such algorithm that is used for seismic data analysis. Migration allows for the correct positioning of subsurface structures and reflectivity. The migration algorithms are broadly categorized as (1) ray-based, for example, Kirchhoff migration as described in Schneider, 1978, (Schneider, W., 1978, Integral formulation for migration in two and three dimensions, Geophysics, 43, 49-76) and (2) wave equation based, for example, Reverse-time migration (RTM) Hemon, 1978 (Hemon, C., 1978, Equations d'onde et modeles. Geophysical Prospecting, 26, 790-821), Whitmore, 1983 (Whitmore, N. D., 1983, Iterative depth migration by backward time propagation: 53rd Annual International Meeting, SEG, Expanded Abstracts, 382-385), Baysal, et al., 1983 (Baysal, E., Kosloff, D. and Sherwood, J., 1983: Reverse time migration, Geophysics, 48, 1514-1524), and McMechan, 1983 (McMechan, G. A., 1983, Migration by extrapolation of time-dependent boundary values. Geophysical Prospecting, 31, 413-420.).

Least-Squares Migration (LSM) has been proposed to seek an inverted image, which generates simulated data that best matches the recorded seismic data. This method effectively improves the resolution of the seismic image, compensates for inadequacies for the recorded seismic data due to acquisition, compensates for image illumination, and attenuates imaging artefacts.

LSM is traditionally solved by iterating where each iteration typically includes: a migration, a de-migration (modelling) and a comparison to the real seismic data being imaged. This approach can be extremely demanding in terms of computer resources and time. Alternative solutions have been proposed to make the process more feasible, for example Claerbout and Nichols, 1994 (Claerbout, J., and D. Nichols, 1994, Spectral preconditioning, in SEP-82: Stanford Exploration Project, 183-186.), Rickett, 2003 (Rickett, J., 2003, Illumination-based normalization for wave-equation depth migration: Geophysics, 68, 1371-1379) and Guitton, 2004 (Guitton, 2004, Amplitude and kinematic corrections of migrated images for non-unitary imaging operators: geophysics, 69, 1017-1024).

However, all these algorithms have their own limitations. For example, the algorithm described by Guitton, 2004, has some difficulties in implementation because the filters used to generate the image can be multi-dimensional and thus, they have a dip dependent response. Because the filters' size is limited, their ability to apply different corrections to different dips at different locations is hindered. Since the response is non-stationary and changes spatially due to structure and migration velocity, the size of the filter needs to be kept small in order to be able to capture these changes. All these effects compromise the quality of the updated image and effectiveness of the process. The other known algorithms have their own limitations that are known in the art and thus, not discussed herein.

Thus, there is a need for a new process that handles the recorded seismic data in a more efficient way, reduces a time spent by the computing device for generating the image of the subsurface, and overcomes the limitations noted above with the existing methods. Accordingly, it would be desirable to provide systems and methods with such capabilities.

SUMMARY

According to an embodiment, there is a method for calculating an image of a subsurface based on least square migration and image de-convolution using a matching operator F. The method includes receiving seismic data d; computing a first image m of the subsurface based on the seismic data d, computing a second image h of the subsurface based on the first image m; applying a transform operation to the first and second images m and h to obtain a first transform of the first image and a second transform of the second image; calculating the matching operator F by matching the first transform of the first image to the second transform of the second image; and generating an updated image $m^{updated}$ of the subsurface based on the matching operator F and the first transform of the first image.

According to another embodiment, there is a computing device for calculating an image of a subsurface based on least square migration and image de-convolution using a matching operator F. The computing device includes an interface for receiving seismic data d; and a processor connected to the interface. The processor is configured to compute a first image m of the subsurface based on the seismic data d; compute a second image h of the subsurface based on the first image m; apply a transform operation to the first and second images m and h to obtain a first transform of the first image and a second transform of the second image; calculate the matching operator F by matching the first transform of the first image to the second transform of the second image; and generate an updated image $m^{updated}$ of the subsurface based on the matching operator F and the first transform of the first image.

According to still another embodiment, there are computing systems and computer-readable mediums including computer executable instructions, wherein the instructions, when executed by a processor, implement one or more of the methods as noted in the above paragraphs.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
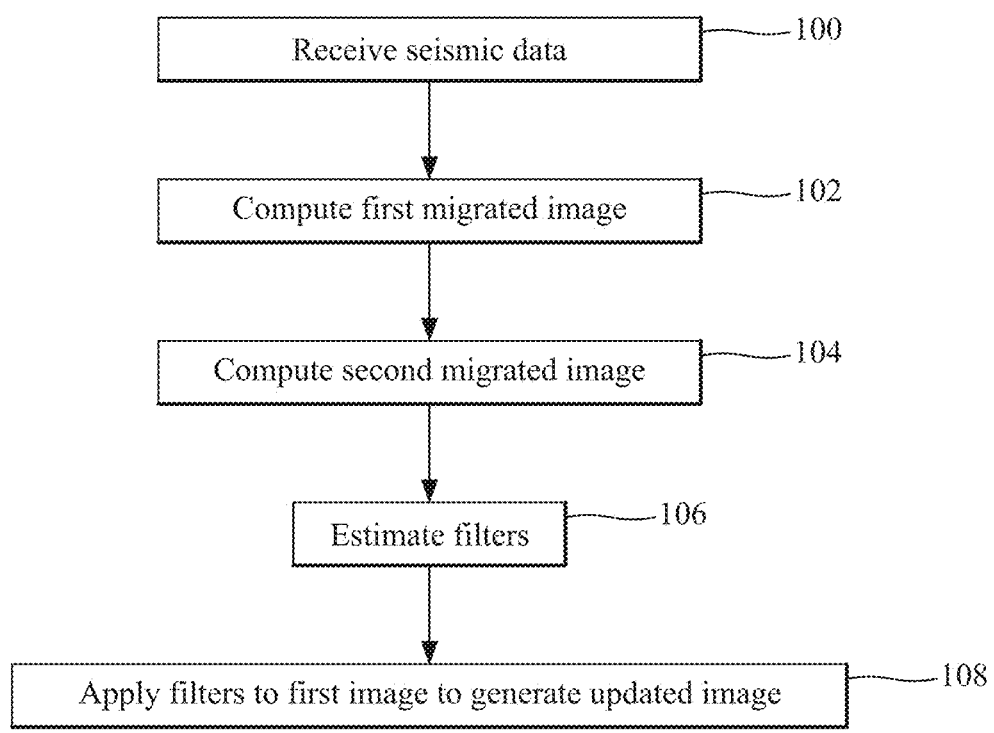
FIG. 1 is a flow chart of an LSM method for calculating an image of a subsurface.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to matching filters applied in an image domain, time-space domain, or a tau-p domain. However, the calculation of the filters in these embodiments is not limited to these domains. Other domains may be used as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a method that approximates a traditional Least Squares Migration algorithm, i.e., the generation of a migrated image which when de-migrated reconstructs the input data in a least squares sense. The method is based on deriving filters, which capture the migration response. The filters are used to remove the migration response from the recorded seismic data, thus compensating for effects such as migration artifacts and illumination. The method relies on the generation and use of auxiliary datasets, which are produced by applying a migration and a demigration. The method derives and applies the filters in the image space. This method enhances the performance and overcomes some of the limitations of known methods.

According to another embodiment, there is another method that approximates the traditional Least Squares Migration algorithm. The method is based on deriving filters, which capture the migration response. The filters are used to remove the migration response from the recorded seismic data, thus compensating for effects such as migration artifacts and illumination. The method relies on the use of auxiliary datasets, which are obtained through the application of a migration operator and a demigration operator. The method derives and applies the filters in the data space, where most limitations of the traditional LSM procedure are highly decreased, thus producing superior results.

According to still another embodiment, there is a method that uses an estimated approximation to the inverse Hessian operator, such that the seismic image is updated and the migration impulse response is removed. One factor for the successful application of this method is to determine the correct update for each and every event in the seismic domain. By defining sets of transforms to seismic events in data-space, which separate events in a complete and unique manner, the inverse Hessian is estimated and applied to the seismic data, which results in a better LSM result.

All these different embodiments are efficient approximations to the LSM method. Thus, the LSM method is discussed next followed by the details of each of these three different embodiments.

The LSM method, as solved by Guitton, 2004, is posed in a least squares sense by minimizing a cost function E, which is given by the following equation:

$$E=\|d-Lr\|^2, \tag{1}$$

where d is the recorded seismic data, L is a demigration 'modelling' operator and r is the LSM solution, i.e., the simulated data. In this problem, d and L are known and r is calculated. Note that each bold symbol in the equations represents a matrix or a vector. The least squares solution to this problem is given by:

$$r=(L^H L)^{-1} L^H d, \tag{2}$$

where $L^H$ is the adjoint of L, i.e., the migration or imaging operator.

The main difficulty in solving equation (2) is in the evaluation of the operator $(L^H L)^{-1}$, which is the inverse of the Hessian. The second part of equation (2) is simply the standard migrated image m $$m=L^H d. \tag{3}$$

Guitton, 2004, proposed to estimate the operator $(L^H L)^{-1}$ (the inverse of the Hessian) by creating another image realization $\hat{m}$ by applying the de-migration operator L and the re-migration operator $L^H$, that is $$\hat{m}=(L^H L)L^H d. \tag{4}$$

A matching filter f between the two image realizations m and $\hat{m}$ is calculated using the following equation:

$$C(f)=\arg \min_f \|m-f*\hat{m}\|, \tag{5}$$

where C(f) is a cost function to be minimized, f is the matching filter (it has many components) derived by matching the two realizations m and m̂, and '*' denotes a convolution.

The filter f then approximates the inverse of the Hessian operator $(L^HL)^{-1}$, i.e., $$f \approx (L^HL)^{-1}. \quad (6)$$

Filter f is then applied to the standard migrated image $L^Hd$ or m, which results in the following approximation of equation (2), $$r = (L^HL)^{-1}L^Hd \approx f*L^Hd. \quad (7)$$

In summary, the algorithm proposed by Guitton, 2004, which is illustrated in FIG. 1, includes a step 100 of receiving the seismic data d, which is recorded with seismic sensors (on land or marine or aerial environment), a step 102 of computing a first (or standard) migrated image $m=L^Hd$, a step 104 of computing a second migrated image $m̂=(L^HL)L^Hd$ by de-migrating and re-migrating the first image $m=L^Hd$, a step 106 of estimating non-stationary filters (i.e., different filters for different time/space windows or space/space windows (depending on the use of a time migration or a depth migration)) f by matching the two image realizations m and m̂, and a step 108 of applying the matching filters f to the first image $m=L^Hd$ to produce an updated image $m^{updated} \approx f*L^Hd$.

This algorithm has some difficulties in implementation because while the filters can be multi-dimensional and thus have a dip dependent response, their size is limited and hence their ability to apply different corrections to different dips at different locations is hindered. Since the response is non-stationary and spatially changes due to the structure and migration velocity, the size of the filter needs to be kept small in order to be able to capture these changes. All these effects compromise the quality of the updated image and effectiveness of the process. Thus, the next embodiments discuss novel approaches to solving the LSM method for overcoming the above noted limitations.

Method I

According to an embodiment, an enhancement to the LSM algorithm discussed with regard to FIG. 1 is now discussed. The new method, which is illustrated in FIG. 2, has a step of prior dip decomposition of the two image realizations, before deriving and applying the multi-dimensional filters for each dip volume separately.

Figure 2:
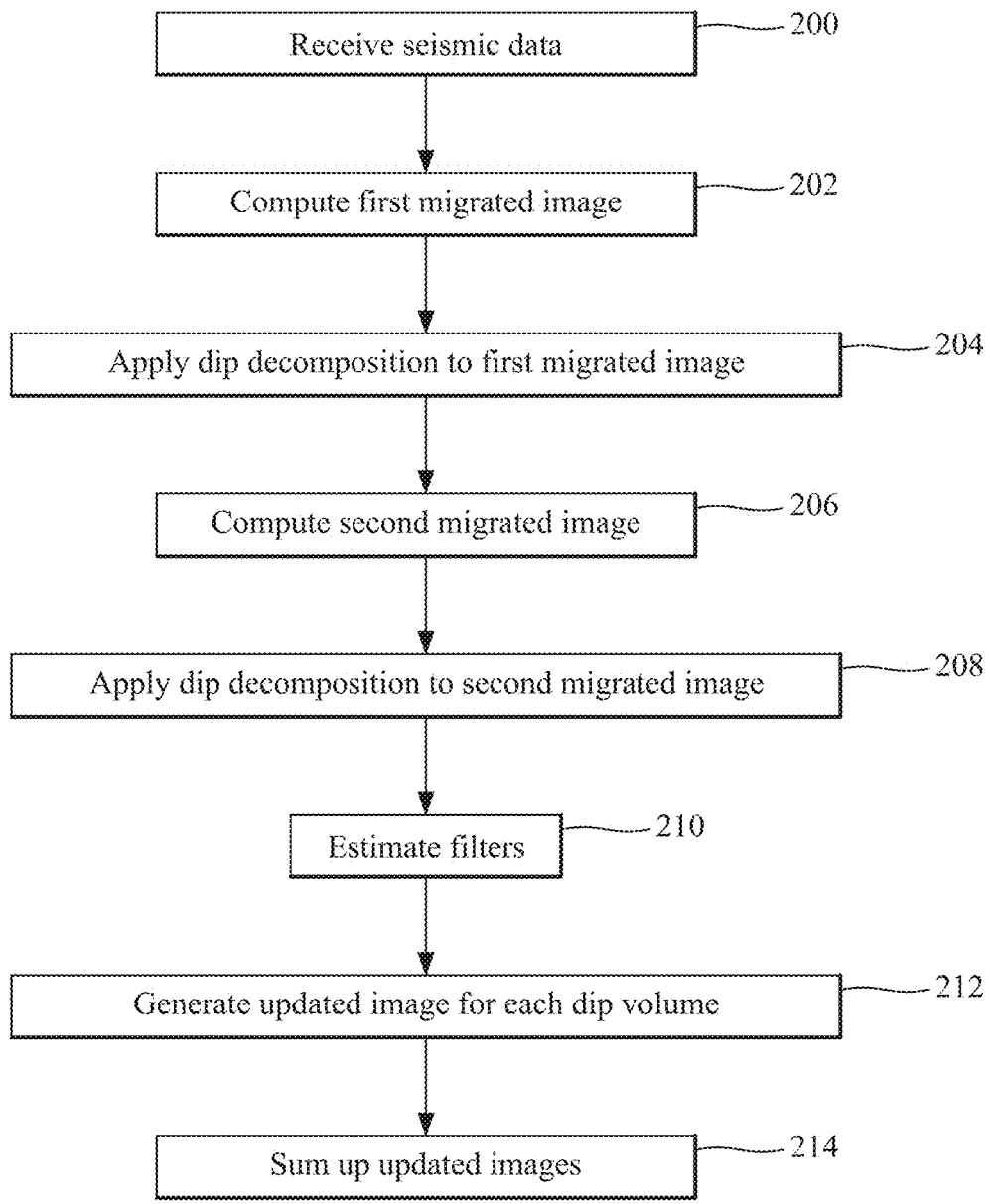
FIG. 2 is a flow chart of a method for calculating an image of a subsurface by using matching filters calculated in an image domain.

More specifically, as illustrated in FIG. 2, the method receives in step 200 seismic data. In step 202, the method computes the standard migrated image m, similar to step 102 discussed above. The image may relate to a stack, partial stack, common surface-offset, common angle, common subsurface offset, or other image representation of the input data using time or depth migration. Different from the method of FIG. 1, in step 204 a transform operation is applied to the first migrated image m. The transform operation may be a dip decomposition, as will be discussed next. The transform operation may also be a Fourier transform, curvelet, ridgelet, contourlet, seislet, linear Radon, parabolic Radon, hyperbolic Radon, shifted-hyperbolic Radon, wavelet, complex wavelet, etc., some of which are described in Yilmaz, Öz (2001), "Seismic data analysis," Society of Exploration Geophysicists, ISBN 1-56080-094-1; E. Candes and D. Donoho, "Curvelets—a surprisingly effective nonadaptive representation for objects with edges," in: A. Cohen, C. Rabut and L. Schumaker, Editors, Curves and Surface Fitting: Saint-Malo 1999, Vanderbilt University Press, Nashville (2000), pp. 105-120; E. Candes, "Ridgelets: theory and applications," Ph.D. thesis, Department of Statistics, Stanford University, 1998; and F. Matu's and J. Flusser, "Image representation via a finite Radon transform," IEEE Trans. Pattern Anal. Machine Intell., vol. 15, no. 10, pp. 996-1006, October 1993). The transform operation transforms the first image m to a first transform of the first image. The first image and the first transform of the first image may be in the same domain, as in Method I or in different domains as discussed later with regard to Method III.

For the present embodiment, the transform operation is considered to be a dip decomposition. The dip decomposition is run on the standard migrated image m, which produces 'n' dip images '$m_i$', i.e., '$m_1, m_2, m_3, \ldots, m_n$' that correspond to dip volumes '$V_i$'. Note that the dip decomposition algorithm determines the nature of the dip volume. For example, if a curvelet transform is used as a dip decomposition, the curvelet transform would partition the image into volumes determined by what is typically called "wedges" and "scales." In this instance a wedge represents a dip while a scale represents a wave-number. In step 206, a second migrated image 'h' is computed by de-migrating and re-migrating the first image m. In step 208, the transform operation is applied to the second image h. If the transform operation is the dip decomposition process, the dip decomposition process is run on the second migrated image h, which produces 'n' dip images '$h_i$', i.e., '$h_1, h_2, h_3, \ldots, h_n$' that correspond to the dip volumes $V_i$. For each dip volume $V_i$, a corresponding pair of images $m_i$ and $h_i$ is used in step 210 to estimate filters '$F_i$' by matching the second image $h_i$ to the first image $m_i$. For each dip volume $V_i$, step 212 applies the filters $F_i$ to the first migrated images $m_i$ to produce the updated images $m_i^{updated}$. In step 214, the method sums up all updated images $m_i^{updated}$ from all dip volumes $V_i$ (all scales and dips in the case of a curvelet transform) to produce the final updated image '$m^{updated}$'. The summation process need not be a straight addition and may depend on the nature of the transform. For example, a weighted addition may be used to attenuate undesirable noise that may be present on some frequencies and/or scales and/or dips. Note that the filter estimation and application process also depends on the dip decomposition transform method. A matching filter in this case is viewed as a generalized matching function or operator. For instance, a curvelet domain filter estimation and application could be utilized. An example for curvelet domain matching for multiple subtraction could be found in WU, X., and HUNG, B., 2015, "High-fidelity adaptive curvelet domain primary-multiple separation," First Break volume 33 January 2015 pp 53-59. The matching filter may be a convolutional filter, e.g., a Wiener filter, which may be amplitude only, phase only, or a combination of amplitude and phase which may vary as a function of frequency and/or wavenumber.

Because the method (1) runs a priori the dip de-composition algorithm in steps 204 and 208 and (2) derives the multi-dimensional filters for each dip (and scale for curvelets) volume, it advantageously adds an extra degree of freedom for the filters, thus allowing them to discriminate the dip even better, without loss of stability and without too much reliance on the size of the filters. This means that the size of the filters is allowed to stay small and still fully capture changes in the geology and velocity of the surveyed subsurface.

Figure 3A:
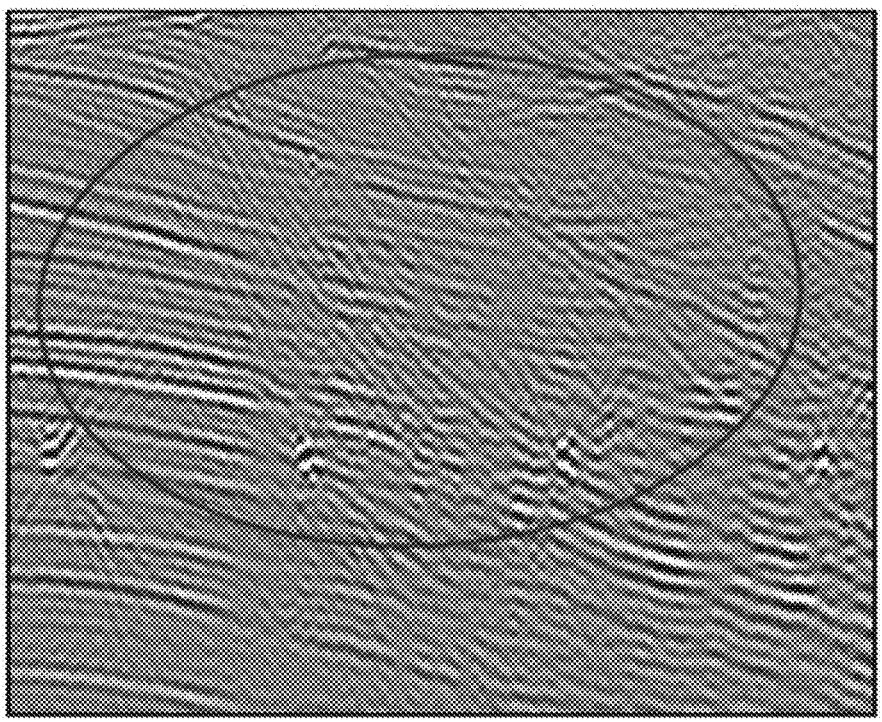
FIG. 3A shows the image calculated with the method of FIG. 1
Figure 3B:
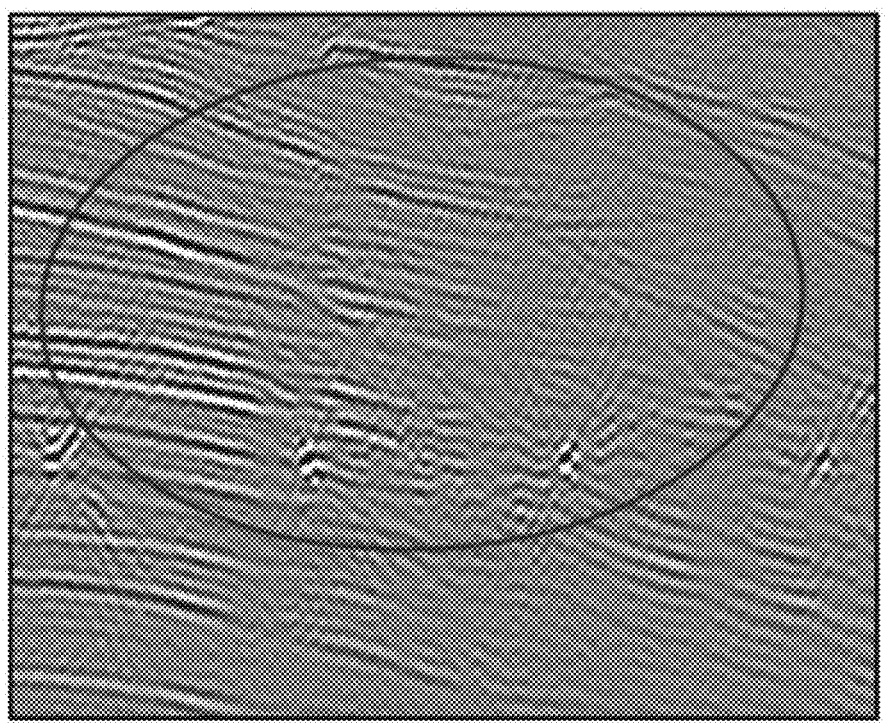
FIG. 3B shows the image calculated with the method of FIG. 2.

FIG. 3A shows the image of the subsurface calculated with the method of FIG. 1 while FIG. 3B shows the image of the same subsurface calculated with the method of FIG. 2. A comparison between FIGS. 3A and 3B illustrates the benefit of the dip decomposition process as the migration artefacts are much better attenuated in FIG. 3B. Note that it is possible to further decompose the images in other domains for the matching operation of step 210.

Method II

According to another embodiment, an alternative algorithm for enhancing the LSM method is now discussed. For this embodiment, the inventors have found that the least squares image r (or inverted image) can be generated by the following equation:

$$r = L^H(LL^H)^{-1}d. \qquad (8)$$

This equation is the data space version of equation (2). Intuitively, equation (8) up-weights and down-weights areas in the data space (e.g., time-space domain) to find the least squares solution. By adopting the principle described in Method I, it is possible to approximate the operator $(LL^H)^{-1}$ through the use of an auxiliary dataset and a matching process. This time, the first realization is the real data d while the auxiliary realization s is created through migration of the real seismic data d followed by a de-migration operation. The filters are then derived in the data space and not in the image space as in the previous method.

The auxiliary realization or the auxiliary modelled data s may be obtained by using the following equation:

$$s = LL^Hd, \qquad (9)$$

where operator $L^H$ migrates the seismic data d and operator L demigrates the image $L^Hd$.

The filters are derived by matching the real data d and the modelled data s using the minimum of the cost function C(f), with f being the matching filter:

$$C(f) = \arg\min_f \|d - f * s\|. \qquad (10)$$

The matching filters are now described by:

$$f \approx (LL^H)^{-1}. \qquad (11)$$

These filters f are applied to the real data d to obtain updated data c and then the updated data c is migrated with operator $L^H$ to produce the updated image $m^{updated}$ approximating equation (7), that is:

$$m^{updated} \approx L^H(f * d) = L^Hc. \qquad (12)$$

Figure 4:
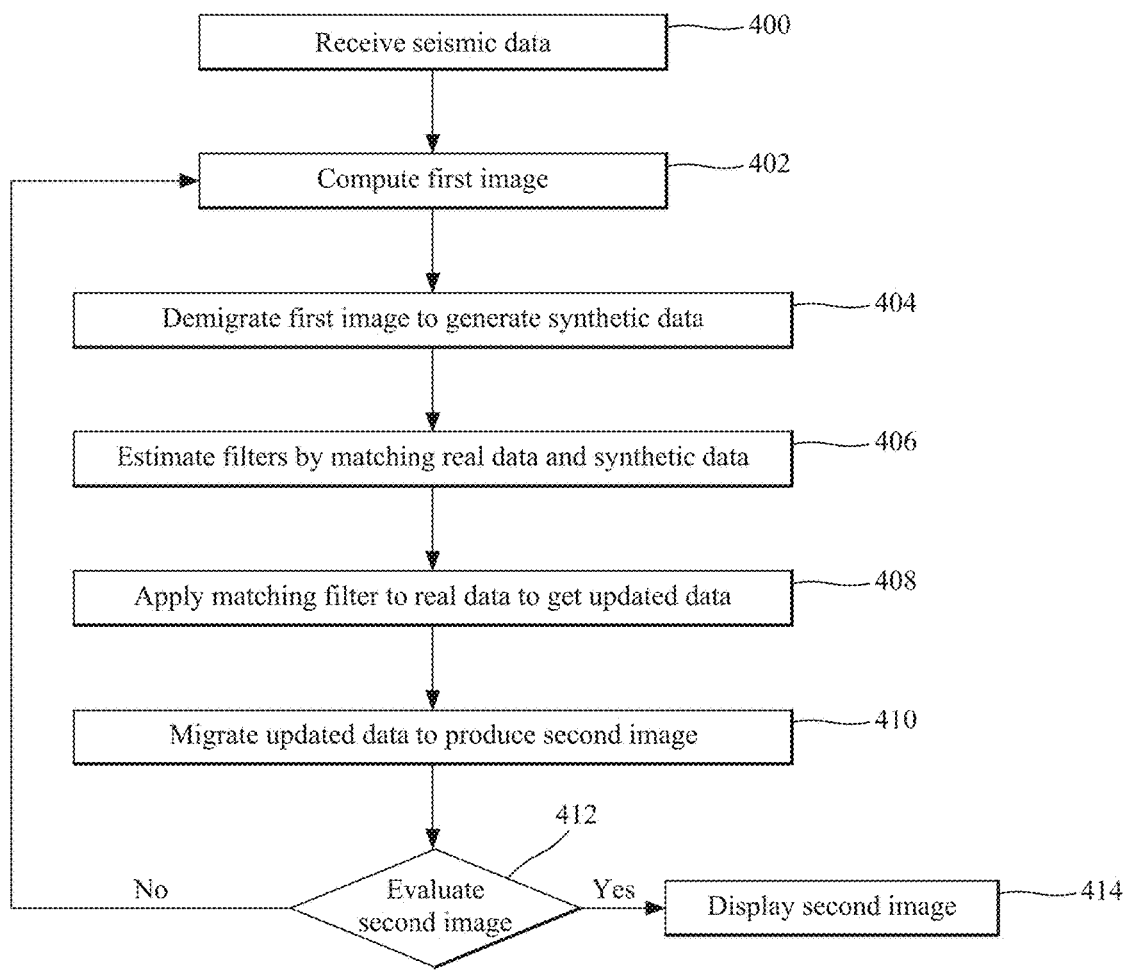
FIG. 4 is a flow chart of a method for calculating an image of a subsurface by using matching filters calculated in a data domain.

This method is illustrated in FIG. 4 and includes a step 400 of receiving real seismic data d, a step 402 of computing a first image m by migrating the real seismic data d, a step 404 of de-migrating the first image m to produce modeled synthetic data s, a step 406 of estimating filters F by matching the two data-space realizations d and s (note that this step takes place in the data space and not in an image space as in previous embodiments), a step 408 of applying the matching filters F to the real data d to obtain updated seismic data c, and a step 410 of migrating the updated seismic data c to produce the updated image $m^{updated}$, which represents the second image of the surveyed subsurface. If in step 412 it is determined that the updated image $m^{updated}$ is not accurate enough, the method returns to step 402 and re-computes the standard image m by migrating the updated data c, and then the method repeats the other steps until the updated image $m^{updated}$ is as accurately as desired. Otherwise, the method displays the updated image $m^{updated}$ in step 414. The images may relate to stack images, partial stack images, common surface-offset, common angle, common subsurface offset, or other image representation of the input data using time or depth migration.

Because this method derives and applies the filters F in the data space, where the seismic data are much more stationary (no velocity or stretch effect), and the Fresnel zone is much larger, the filter derivation process has a much better chance of success, and does not need to rapidly change to capture the geology as they do in the image space as in prior attempts and Method I. In one application, the method discussed with regard to FIG. 4 may include an additional step of dip decomposition, similar to that discussed in Method I.

Figure 5A:
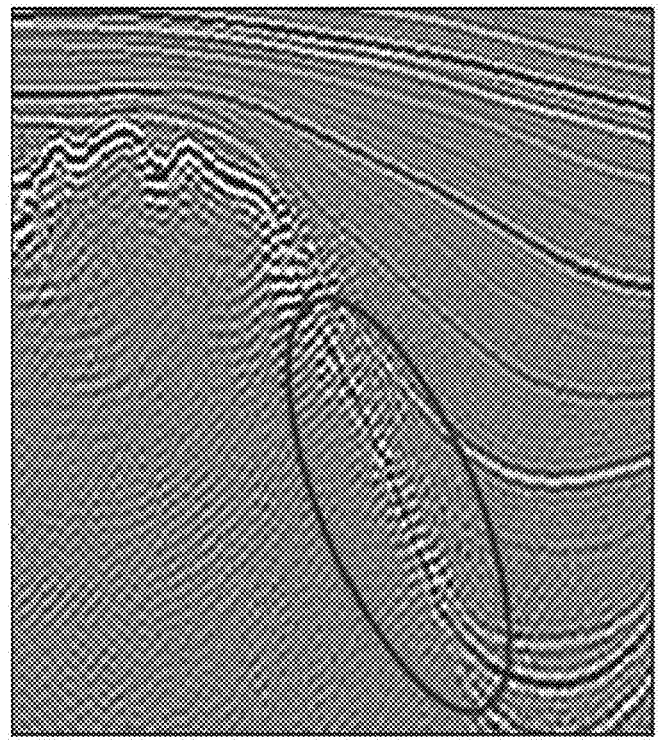
FIG. 5A shows the image calculated with the method of FIG. 1
Figure 5B:
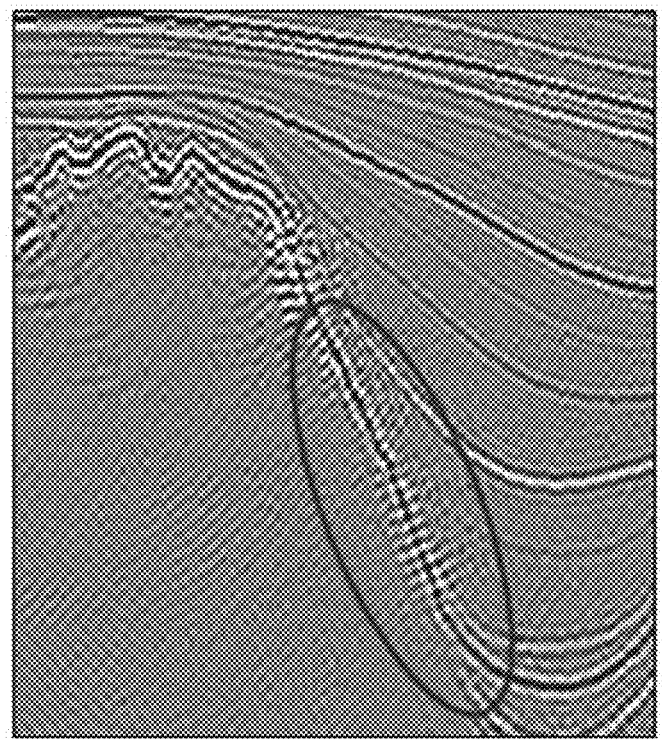
FIG. 5B shows the image calculated with the method of FIG. 4.

FIG. 5A shows the final image calculated with the method of FIG. 1 while FIG. 5B shows the final image calculated with the method of FIG. 4. A comparison of the two figures illustrates the benefit of the data space implementation in Method II versus the traditional method as described in Guitton, 2004 as the new method focuses the steep structure much better and is more stable due to the improved stationary behavior in the data space. In addition, the overall noise level is reduced in FIG. 5B comparative to FIG. 5A.

To obtain the image illustrated in FIG. 5B, the following method may be used. The method includes a step of receiving seismic data d; a step of computing an initial image m of the subsurface based on the seismic data d; a step of calculating modelled synthetic data s based on the initial image m; a step of calculating matching operator F by matching the modelled synthetic data s to the seismic data d; and a step of generating an updated image $m^{updated}$ of the subsurface based on the matching operator F and the seismic data d.

The step of calculating modelled synthetic data s may include applying first a migration operator $L^H$ to the seismic data d followed by applying second a demigration operator L, wherein the migration operator $L^H$ is an adjoint of the demigration operator L and the migration operator $L^H$ transform an object from an image space to a data space and vice versa, respectively. The step of calculating the matching operator F may include applying a cost function in a data space, between the seismic data d and the modelled synthetic data s, to calculate the multi-dimensional matching filter F. The step of generating the updated image may include applying the matching operator F to the seismic data d to obtain updated data c; and migrating the updated data c with the migration operator $L^H$ to produce the updated image $m^{updated}$.

The seismic data d and the modelled synthetic data s are in a data space and the initial and updated images m and $m^{updated}$ are in an image space, which is different from the data space, and the demigration operator L and the migration operator $L^H$ transform an object from the image space to the data space and vice versa, respectively.

The LSM algorithm in general and its enhancements including Methods I and II discussed above rely on the modelling (or migration) operator L. To take full benefit of this modelling operator, extra physics can be incorporated into the processes of FIGS. 2 and 4. In one application, for example, it is possible to include seismic attenuation 'absorption' or reflections from the water surface as with ghosts and surface multiples. These effects would be implicitly compensated within the matching filters in either Method I or II. In another application, spectral shaping could also be incorporated into the process by applying the shaping process on the de-migrated data. In this case, the matching filters will include their effect as well. For example, these could be wavelets or/and integrating filters. This could be part of an acoustic or elastic inversion process.

In one embodiment, one or more of the methods discussed above may be applied to pre-stack data. In this regard, one objective of the seismic processing is to find the properties of the subsurface. While the structural image m discussed above is achieved by what is commonly referred to as stacking (i.e., the sum of all energies corresponding to a certain location or image point), some attributes of the subsurface, like the energy or amplitude variation with offset or angles, can help in providing more information like porosity or fluid content of the rocks of the subsurface. This un-summed image is referred to as the pre-stack image $p_i$. In other words, the pre-stack image $p_i$ is different from the structural image m in the sense that the stack or structural image m includes a summation of at least two of the subsets of migrated data (e.g., angle gathers, surface offset classes, etc.) while the pre-stack image $p_i$ includes one or more of these subsets. In this embodiment, it is described how the above discussed Methods I and II can be applied to pre-stack data.

Figure 6:
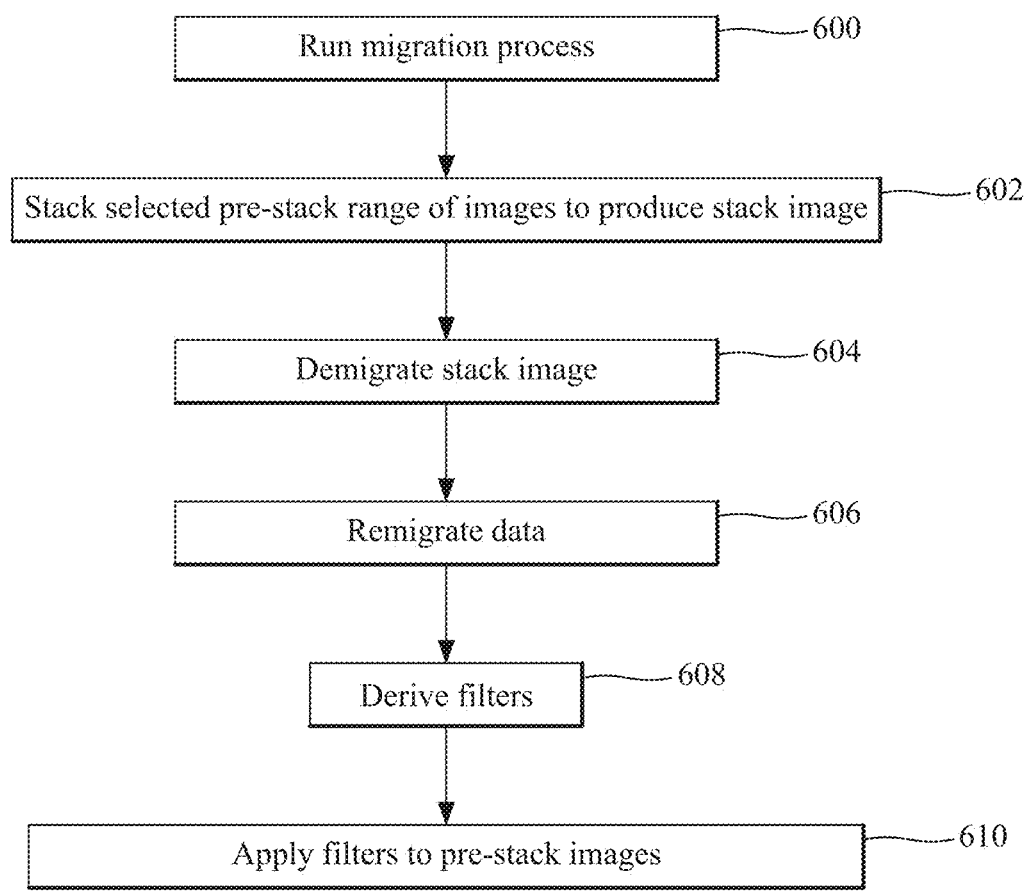
FIG. 6 is a flow chart of a method for calculating an image of a subsurface by using matching filters calculated based on pre-stack and stack data.

In one application, a method for generating pre-stack data, as illustrated in FIG. 6, includes a step 600 of running a migration process on actual seismic data d to produce plural pre-stack images $p_i$. This means that either the input to migration is split into subsets and each subset is migrated separately, or that the migration outputs different subsets directly (for example sub-surface angle output from RTM). Note that the splitting may occur before, after or during migration. Each subset is defined by a geometrical and/or physical property, for example, angle gathers (each volume has a constant sub-surface angle), or surface offset classes (i.e., each volume has a constant surface offset), etc. As discussed above, the structural image m includes all these sets, i.e., m is equal to the sum of all pre-stack images $p_i$. The pre-stack images may be muted prior to stacking, for example, to limit the stack to a limited reflection angle range (e.g., angle stacks). In step 602, a pre-stack range from the images p, are stacked to produce a stack image s. Stack image s includes less subsets than image m. For example, in one application, the method selects some or all subsets output from migration, and sums/averages them together to produce the stack image s. A selection criteria may be set to produce the stack image s with optimal signal-to-noise ratio or to highlight desired geological features of the surveyed subsurface.

In step 604, the method de-migrates the stack image s to produce de-migrated data and in step 606 the method re-migrates the de-migrated data to produce pre-stack output $n_i$. The de-migration and migration operators discussed above with regard to Methods I and II may be used in steps 604 and 606. In step 608, for each pre-stack image $p_i$, derive the Hessian of Method I by matching its corresponding re-migrated images n, to the stack image s. In step 610, the method applies the derived filters (which are the inverse of the Hessian) to the pre-stack images $p_i$ to obtain the updated pre-stack images. While this method is explained for use with Method I, one skilled in the art would understand that this method is also applicable to Method II, after deriving and applying the matching filters in the data space rather than the image space.

In another application, the above discussed methods may be applied to time-lapse (4D) seismic data sets. In this regard, in the seismic processing industry, it is often required to simultaneously process multiple datasets at a time. This can be put in a time-lapse context where the main interest is in determining the changes in the subsurface conditions between the times at which the two data sets are taken, to guide infill well drilling and maximize oil and gas production.

During a 4D seismic acquisition survey, the source and receiver positions are often not repeated, as the monitor dataset (the one later in time) might have been acquired several years apart from the base dataset. In addition, the methods used for collecting the base and monitor datasets may possibly be different methods, for example one vintage could be collected with a Towed Streamer (TS) geometry while the other could be collected with an Ocean Bottom Cable (OBC) geometry. Different data acquiring parameters can mask the true changes in the subsurface (4D signal) if not dealt with properly.

These geometrical differences will hide the true subsurface properties embodied in different image illumination or extra noise. Applying Methods I or II in this context normalizes the illumination between the different dataset realizations. For example, while performing any of the presented methods, an extra step can be added, that includes de-migrating a first realization to the second's geometry or vice versa and evaluating the changes between the two. This step may be performed in the image space or data space. Other improvements to this method may be implemented, as discussed later.

Method III

In still another embodiment, the LSM method is modified to use complete and unique data space event separation. In this regard, the image de-convolution and similar techniques are well known approaches to LSM. This class of methods relies on estimating approximations to the inverse Hessian operator, such that the seismic image is updated and the migration impulse response is removed. A factor for the successful application of these methods is to determine the correct update for each and every event in the seismic domain. By defining sets of transforms of seismic events in the data-space, which separate events in a complete and unique manner, the inverse Hessian is optimally estimated and when applied to the seismic data results in a better LSM output.

As discussed above, the LSM problem is typically posed as described by equation (1) and the traditional solution is given by equation (4). However, the solution of equation (4) is difficult and computer expensive; it requires multiple iterations to converge (for example using conjugate gradients). Traditional approximations to LSM have been devised to improve the efficiency and to have better control over the process, for example Guitton (2004) and Ricket (2003) noted above.

Equation (4) is more suited to over-determined systems, which is not necessarily the case for the migration problem; it could very well be underdetermined. In the theory of generalized inverses Ben-Israel and Greville, 2003 (Adi Ben-Israel and Thomas N. E. Greville, 2003, Generalized inverses. Theory and applications (2nd ed.), New York, N.Y.: Springer, ISBN 0-387-00293-6), equation (1) has different solutions and equation (4) is not the only route. For underdetermined systems, a generalized solution for equation (1) is given by:

$$r = L^H (LL^H)^{-1} d. \qquad (13)$$

Equation (13) may be approximated as a series of operations that may include generating an auxiliary modelled data s by migrating and then de-migrating the input d back to the data space, as described by equation (14):

$$s = LL^H d. \qquad (14)$$

The operations noted in equation (14) may also be viewed as applying a transform operation L to an image $L^H d$, similar to step 204 discussed above with regard to FIG. 2. However, in this case, transform operation L is not a dip decomposition, but rather a Fourier transform or a tau-p transform. Transform operation L may be implemented as other mathematical transforms.

Filters F are then derived by matching the auxiliary modelled data s to the real input data d, i.e., the function $\|d-Fs\|$ is minimized to find filters F. The filters may be 1D, 2D, 3D, 4D, 5D or any other size depending on the complexity of the data. Numerous filters may be derived within spatial, temporal, or spatio-temporal windows to respect the non-stationarity of the correction they represent. This may result in numerous convolutional filters.

The matching filter is now effectively an approximation of the inverse operator in equation (13), that is $F \approx (LL^H)^{-1}$. These filters are now applied to the real data d for generating a new input dataset c, which is then migrated to obtain the migrated image m $$m = L^H c, \; c = Fd. \tag{15}$$

For this approximation to be successful, proper scaling and filtering (i.e., application of filter F) needs to be performed for each event in the seismic data d. In an ideal scenario, each event in the seismic data needs to have its own filtering operator. This is a very difficult condition to meet in practice by using traditional matching filters. To overcome this limitation, the inventors have discovered an approach that operates in a model domain, e.g., the tau-p domain. As discussed later, the model domain may be any of a plurality of domains, except the time-space domain and the image domain.

A seismic event in the data space (i.e., time-space domain) is defined by a set of attributes. For example, the seismic event or input wave-field may be described as a function of shot and receiver spatial coordinates. The coordinates may be in 2D (for example, relating to a single source and a single streamer), or in higher dimensions (e.g., both sources and receivers sampled in x and y dimensions for land or OBN acquisition). The input data may be transformed into a model domain, for example, a tau-p domain. Other domains may be used. The tau-p domain represents the input data as a function of the slowness of the arrivals. The tau-p transform may be applied in any domain, for example shot domain, receiver domain, cmp domain, offset volume domain, common channel domain. Alternatively, higher dimensional model domains, e.g., tau-px-py domains may be used in, for example, an offset volume domain or the joint shot-receiver domain. One possible set of attributes are:

(1) the space coordinates for shots '$\underline{x}_S$' and receivers '$\underline{x}_R$';
(2) the arrival time of seismic events '$\tau$'; and
(3) the slowness in shot '$\underline{p}_S$' and receiver '$\underline{p}_R$' domains.

According to this embodiment, an optimal approximation of equation (13), using the matching filters, can be obtained by deriving and applying the matching operators in a fully and uniquely defined model domain (the model domain may be defined by attributes (1) to (3) noted above).

For example, a running shot and receiver slowness transform provides the required features. Poole 2013 (Poole, G., 2013, Premigration receiver deghosting and redatuming for variable depth streamer data: Presented at the 83$^{rd}$ Annual International Meeting, SEG) provides a description of the slowness transform and its use.

To achieve this, both the input real data d and the modelled auxiliary data s are decomposed (or transformed) into the shot and receiver slowness domain, and a matching process is then performed for calculating the filters F, by minimizing the function given by equation (16):

$$\|d(\tau;\underline{x}_S,\underline{x}_R;\underline{p}_S,\underline{p}_R) - Fs(\tau;\underline{x}_S,\underline{x}_R;\underline{p}_S,\underline{p}_R)\|. \tag{16}$$

Note that filters F are calculated in this embodiment in the slowness domain (or model domain), not in the image domain as in Method I or in the data domain as in Method II. The calculated filters F are then applied to the shot and receiver slowness domain data to obtain decomposed updated data $c_{xyz}$, and the decomposed updated data $c_{xyz}$ is reverse tau-p transformed to the time-space domain to obtain new data c, and then this the new data c is migrated to produce an updated image $m^{updated}$ given by:

$$m^{updated} = L^H c, \text{ where } c(\tau;\underline{x}_S,\underline{x}_R;\underline{p}_S,\underline{p}_R) = Fd(\tau;\underline{x}_S,\underline{x}_R;\underline{p}_S,\underline{p}_R). \tag{17}$$

The above set of attributes (1) to (3) are optimal for the shot-domain migration similar to RTM. For common offset migrations like Kirchhoff, controlled beam, or Gaussian beam migration a more suitable decomposition transform may be midpoint-x and midpoint-y, where the midpoint is the position related to the shot position plus the receiver position divided by two.

Figure 7:
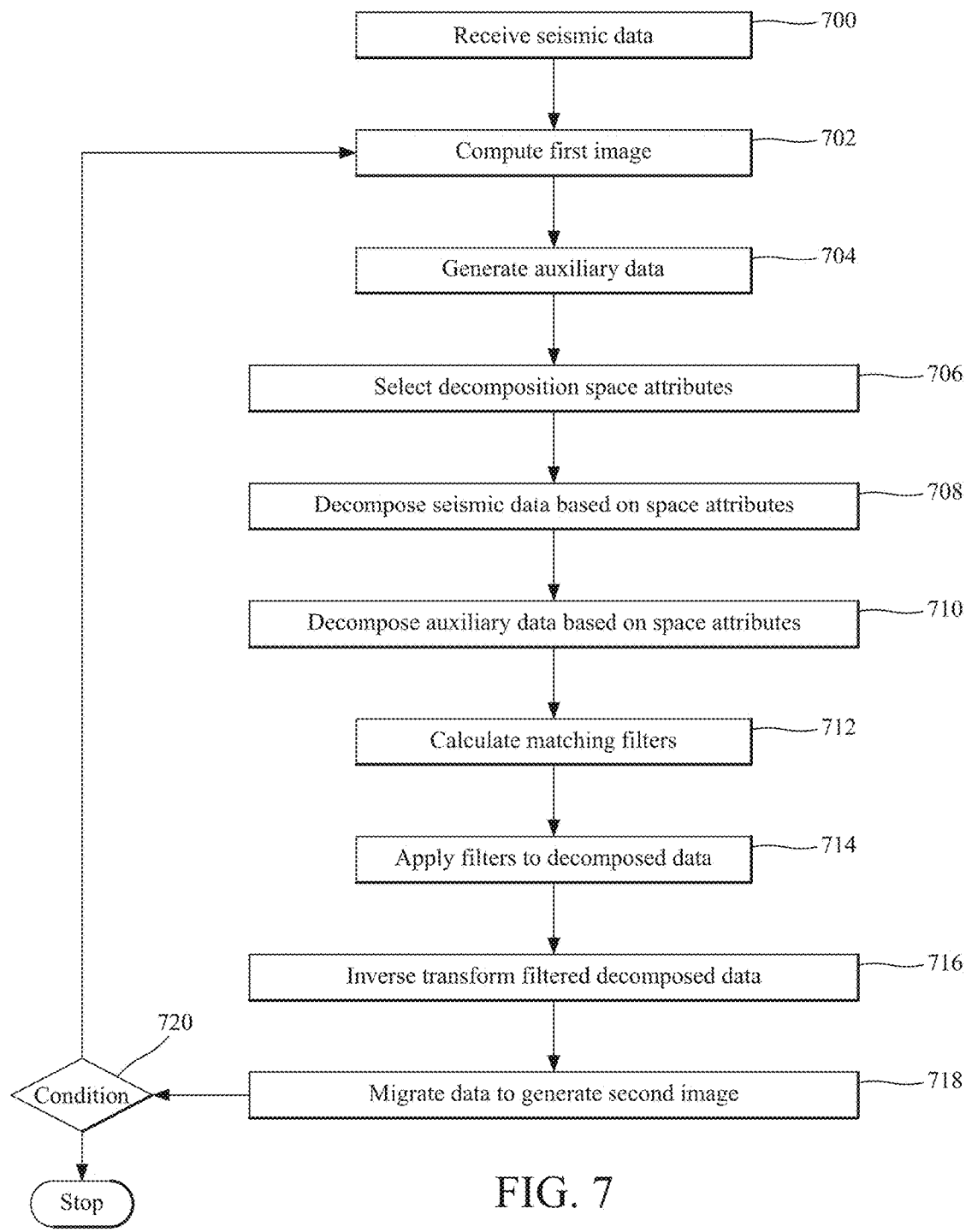
FIG. 7 is a flow chart of a method for calculating an image of a subsurface by using matching filters calculated in a model domain.

The method discussed above is illustrated in FIG. 7 and it includes a step 700 of receiving seismic data d. As in the previous embodiments, the seismic data d may be collected in a land environment, marine environment or aerial environment, and it may be collected with one or more types of sensors, i.e., hydrophones, geophones, accelerometers, etc. In step 702, the method computes a first image m by migrating the real seismic data d. The method may use any known migration process. In step 704, the method de-migrates (applies transform operation) the first image m to produce the modeled auxiliary data s, for example, using equation (14). Note that modeled auxiliary data s is in the data domain. In step 706, appropriate decomposition space attributes that define seismic events are selected. For example, the space attributes may be space coordinates of the shots $x_s$ and space coordinates of the receivers $x_r$. However, in another embodiment, the space coordinates may be the space coordinates of the mid-points $x_m$ discussed above. The selected space coordinates are generically identified herein by xyz.

In step 708, the real seismic data d is transformed to the selected decomposition (model) domain, e.g., 'xyz' decomposition, resulting in $d_{xyz}$ seismic data. In step 710, the modeled auxiliary data s is transformed to the selected decomposition domain, resulting in $s_{xyz}$. Filters F are estimated in step 712 by matching the two decomposed data realizations, $d_{xyz}$ and $s_{xyz}$, in the model domain (which is different from the image domain and the data domain), for example, based on equation (16). Those skilled in the art would understand that equation (16) is just an example and other equations may be used for calculating filters F.

In step 714, matching filters F are applied to the decomposed seismic data $d_{xyz}$ to obtain updated decomposed data $c_{xyz}$ and this updated decomposed data is inverse transformed (i.e., from the model domain to the data domain using, for example, a tau-p transform) in step 716 to updated data c. The updated data c is then migrated in step 718 to produce the updated image $m^{updated}$. If the updated image satisfies a given condition in step 720, for example, adequate illumination compensation, then the method stops. Otherwise, the method returns to step 702 to iterate and find a better updated image.

While the use of a shot-receiver slowness domain has been discussed for the decomposition space, it should be noted that many other model domains may be used. This may include (but are not limited to) frequency-wavenumber FK, curvelet, ridgelet, contourlet, seislet, parabolic Radon, hyperbolic Radon, shifted-hyperbolic Radon, wavelet, complex wavelet, etc. The model domain may be derived using least squares, sparse inversion, or iterative cleaning (for example using sparseness to overcome aliasing).

The filters F may be Wiener filters or other filters, derived with least squares or sparse inversion. The filters may be derived in the time (or tau) domain or a spectral domain, for example after FFT, wavelet transform, curvelet transform, z-transform, Laplace transform, etc.

The migrated/demigrated and/or input data may be denoised prior to, or after transforming it to the decomposition space. This may involve model domain masking or filtering (for example fx prediction filtering).

While the discussion above has involved deriving filters to match an input dataset to a migrated-demigrated dataset, it should be noted that other migrated/demigrated datasets may be used. Such a different example may include a step of deriving filters matching migrated-demigrated-migrated-demigrated data to migrated-demigrated data, and a step of applying the filters to the seismic data prior to migration. This approach may be combined with least squares migration, sparse norm migration, or applied independently.

Although the above discussed methods calculate a more accurate image of the subsurface, they may still be affected by poor sampling and aperture truncation during the seismic data acquisition. These effects can cause aliasing and illumination problems during the migration process. A common approach to address these issues is either to apply data interpolation before migration and/or to employ some weighting and filtering schemes during migration. LSM, as discussed above, is an alternative solution to this incomplete acquisition problem. The LSM has the potential to handle these issues to generate better amplitudes than standard migration.

In practice, because standard LSM is an iterative process, it can be expensive due to the cost of repeated application of the migration and modelling operators, and has a potentially limited uplift due to its potentially limited representation of the highly complex Earth response. The so-called Hessian LSM approach (discussed in Methods II and III), also known as migration deconvolution, aims to provide the benefits of standard least squares migration but without the need for the costly iteration by estimating the action of the inverse Hessian of the migration/modelling operation. In this approach, as discussed above with regard to the methods illustrated in FIGS. 2, 4 and 6, one step involves deriving a matching filter to map the re-migrated data back to the initial migrated data. The matching filter in this step has the potential to encapsulate the migration problems described above and remove them from the initial migration.

Thus, in addition to the enhancements discussed above with regard to Methods I to III, additional further improvements may be obtained by:
 (1) the application of some form of processing to the first migrated data d and/or the re-migrated data s before computing the matching filter; and/or
 (2) applying another form of processing to the migrated data d prior to the application of the matching filters to the initial migrated data.

Depending on the form of the applied processing, this step has the potential to enhance different aspects of the Hessian least squares migration approach or to make the filter less affected by noise. For example, if the processing is a de-noise process applied to both the migrated data m and the re-migrated data s, then the stability of the matching filters to capture the specific migration artefacts of interest may improve. Alternatively, applying this processing only to the migrated data d would additionally enhance the de-noise aspects of the matching filters, etc.

In one embodiment, the processing step could be a "rolling" stack centred on the current offset and summing neighbouring offsets, such a process performing a de-noise operation while allowing the amplitude variation with offset/angle to be preserved in the seismic data. In another embodiment, the processing step could be the formation of a near, or other, partial stack of the migrated data. Such a process potentially leads to the formation of better structural images. In another embodiment, this process could be time-alignment or warping between main data and auxiliary data, for example, Hale, D., 2009, A method for estimating apparent displacement vectors from time-lapse seismic images: Geophysics, 74, P99-P107. The processing may also include a gain correction, for example, to shape the overall decay of the data in the migration dataset to that of the migration-demigration-migration dataset.

According to the embodiment discussed above, some act in the image domain, i.e., the matching process is performed on the migrated image (e.g., Method I) rather than the data domain (e.g., Method II). Still, another approach acts in a model domain (Method III) which is neither the data domain nor the image domain.

Figure 8:
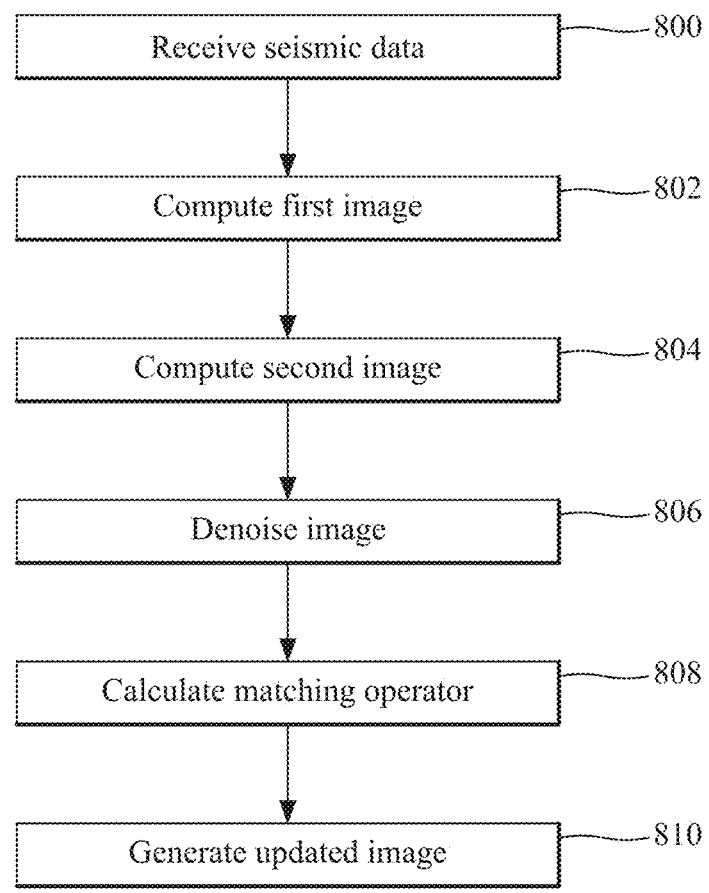
FIG. 8 is a flow chart of another method for calculating an image of a subsurface by using matching filters and a denoising operator.

A method that illustrates this embodiment is now discussed with regard to FIG. 8. The method calculates an image of a subsurface based on least square migration and image de-convolution using a matching operator F by receiving in step 800 seismic data d, computing in step 802 a first image m of the subsurface based on the seismic data d, computing in step 804 a second image h of the subsurface based on the first image m, denoising in step 806 one of the first and second images, calculating in step 808 an operator F to match image h to image m where at least one of these images has been denoised in step 806, and generating in step 810 an updated image $m^{updated}$ of the subsurface based on the operator F and the transform of image m. The step of denoising may involve convolution by a spatial operator. The spatial operator may be a running mean filter, an fx deconvolution filter, a structurally orientated filter, etc.

Those skilled in the art would understand that the matching step may be applied in a pre-stack domain, for example, a rolling stack of surface or subsurface angles. The matching step may also be another multi-channel denoising approach applied in the CIP domain, for example, median filtering, fx filtering, rank reduction, FK filtering, tau-p or tau-q cleaning, etc.

With regard to the seismic data received in Methods I to III, it can be collected with towed streamer, ocean bottom nodes, cable, node, nodes on a rope, autonomous receiver (e.g., hydrostatically balanced with or without its own propulsion), land sensors, transition zone sensors, etc. The seismic data may be recorded with any type of seismic sensor, as for example, hydrophone, accelerometer, geophone, differential hydrophone, particle velocity sensor, particle motion sensor, etc. The receivers generate, when used in a marine environment, a marine streamer dataset that is achieved in a narrow, wide or multi-azimuth, coil shooting or any configuration towed with constant or variable depth (e.g., slant streamer, BroadSeis profile, over-under streamers), and the seismic data is generated with an air gun, marine vibrator, or other source element. Receivers may also be used in ocean bottom survey (nodes, cables, or other with air gun, marine vibrator or other source), land dataset (dynamite, vibrator or other source), or a combination of two or more dataset types.

The recorded seismic data may have been calibrated before applying the processes discussed herein, or calibration scalars may be included in the matrix formulations noted in the above embodiments. Water velocity terms may be constant or allowed to vary with depth. Variation with depth can be of use for OBS datasets where there is a water velocity gradient. The methods may be used for one-sided or split-spread acquisition.

The seismic sources used to generate the seismic data are not limited to any specific type of sources. Some source types include airgun, vaporchoc, flexichoc, marine vibrator, land vibrator, weight drop, dynamite, sparker, boomer, etc., all of which are known in the art and thus, their description is omitted herein. Source elements may be fired according to any known scheme, e.g., continuously, simultaneously, flip-flop, etc.

Figure 9:
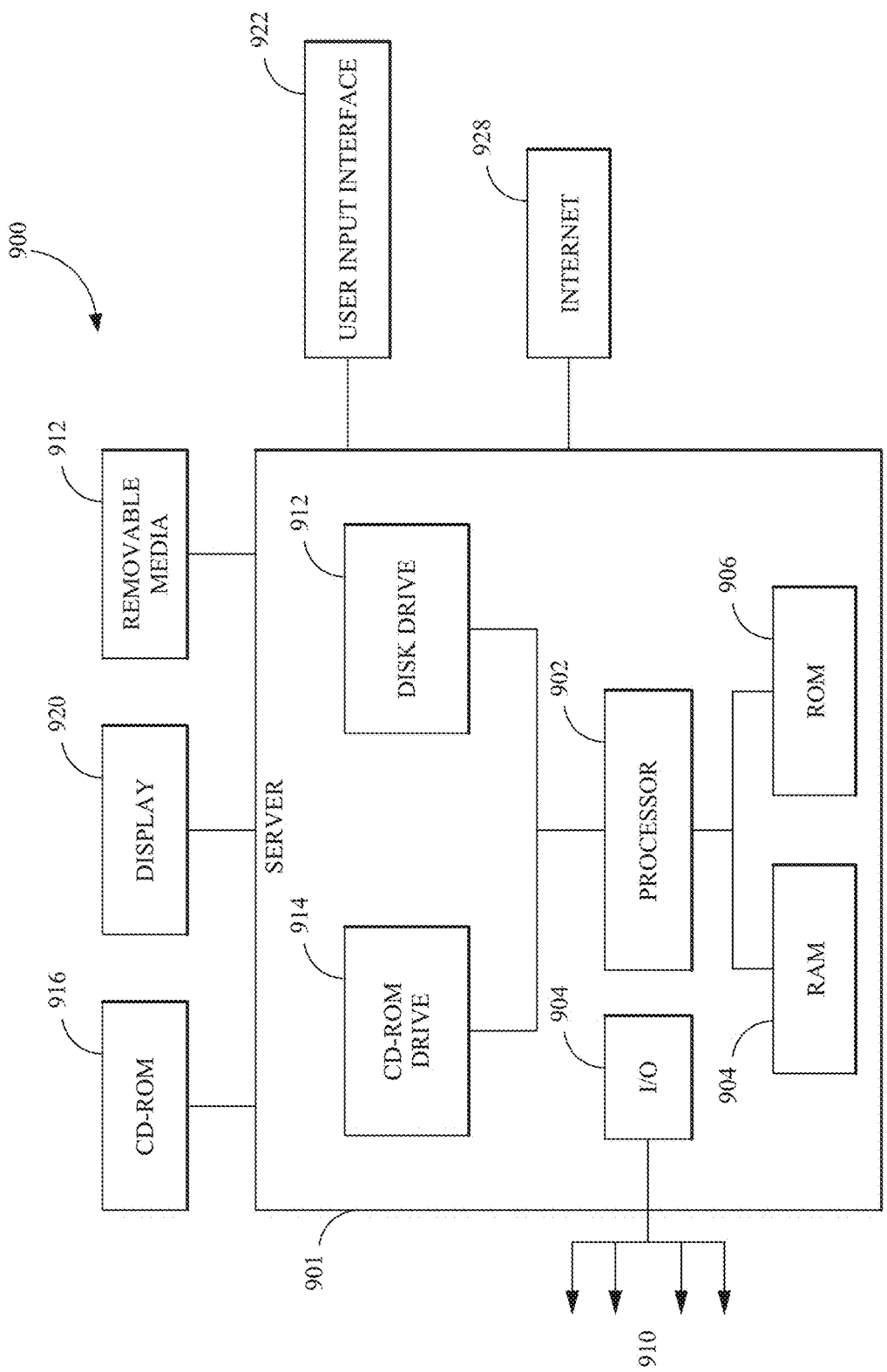
FIG. 9 is a schematic diagram of a computing device on which one or more of the above methods for processing seismic data may be implemented.

The above-discussed procedures and methods may be implemented in a computing device as illustrated in FIG. 9. Hardware, firmware, software or a combination thereof may be used to perform the various steps and operations described herein. Computing device 900 of FIG. 9, although illustrated as a generic device, it is highly specialized and specifically designed for processing seismic data. Examples of this type of computing device are known in the art as not being a generic computing device. However, for the sake of simplicity the computing device is illustrated as generic in FIG. 9.

Exemplary computing device 900 suitable for performing the activities described in the exemplary embodiments may include a server 901. Such a server 901 may include a central processor (CPU) 902 coupled to a random access memory (RAM) 904 and to a read-only memory (ROM) 906. ROM 906 may also be other types of storage media to store programs, such as programmable ROM (PROM), erasable PROM (EPROM), etc. Processor 902 may communicate with other internal and external components through input/output (I/O) circuitry 908 and bussing 910 to provide control signals and the like. Processor 902 carries out a variety of functions as are known in the art, as dictated by software and/or firmware instructions.

Server 901 may also include one or more data storage devices, including hard drives 912, CD-ROM drives 914 and other hardware capable of reading and/or storing information, such as DVD, etc. In one embodiment, software for carrying out the above-discussed steps may be stored and distributed on a CD-ROM or DVD 916, a USB storage device 918 or other form of media capable of portably storing information. These storage media may be inserted into, and read by, devices such as CD-ROM drive 914, disk drive 912, etc. Server 901 may be coupled to a display 920, which may be any type of known display or presentation screen, such as LCD, plasma display, cathode ray tube (CRT), etc. A user input interface 922 is provided, including one or more user interface mechanisms such as a mouse, keyboard, microphone, touchpad, touch screen, voice-recognition system, etc.

Server 901 may be coupled to other devices, such as sources, detectors, etc. The server may be part of a larger network configuration as in a global area network (GAN) such as the Internet 928, which allows ultimate connection to various landline and/or mobile computing devices.

The disclosed exemplary embodiments provide a computing device, software instructions and a method for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for generating an image of a subsurface explored by a seismic survey based on least square migration and image de-convolution using a matching operator F, the method comprising:
    receiving seismic data d acquired for the subsurface during the seismic survey;
    computing a first image m of the subsurface based on the seismic data d;
    computing a second image h of the subsurface based on the first image m;
    applying a transform operation to the first and second images m and h to obtain a first transform of the first image and a second transform of the second image;
    calculating the matching operator F by matching the first transform of the first image to the second transform of the second image; and
    generating an updated image $m^{updated}$ of the subsurface based on the matching operator F and the first transform of the first image,
    wherein the updated image of the subsurface is useable to determine whether oil and/or gas reservoirs are present in the subsurface.

2. The method of claim 1, wherein the transform operation is a dip decomposition.

3. The method of claim 2, wherein the dip decomposition decomposes the first and second images m and h, in an image domain, according to dip volumes $V_i$ of the subsurface, the first transform of the first image is a first dip decomposed image $m_i$, the second transform of the second image is a second dip decomposed images $h_i$, where "i" is an index, and the method further comprises:
    calculating different matching operators $F_i$ for each pair of the first and second dip decomposed images $m_i$ and $h_i$ that have the same index i.

4. The method of claim 3, further comprising:
    calculating an updated image component $m^{updated}_i$ for each pair of first and second dip decomposed images $m_i$ and $h_i$ that have the same index i by applying the different matching operator $F_i$ to a corresponding first dip decomposed image $m_i$.

5. The method of claim 4, further comprising:
    constructing the updated image $m^{updated}$ using the updated image components $m^{updated}_i$ corresponding to dip volumes $V_i$.

6. The method of claim 1, wherein the step of computing a second image h comprises:
    applying a demigration operator L to the first image m followed by applying a migration operator $L^H$, wherein the migration operator is an adjoint of the demigration operator, wherein the demigration operator L and the migration operator $L^H$ transform an object from an image space to a data space and vice versa, respectively.

7. The method of claim 1, wherein the step of calculating further comprises:
applying a cost function in an image space, between the first image m and the second image h, to calculate the matching operator F.

8. The method of claim 1, wherein the seismic data d is in a data space and the first and second images m and h are in image space, which is different from the data space.

9. The method of claim 1, wherein the transform operation is a Fourier transform, curvelet transform, tau-p transform or wavelet transform.

10. The method of claim 1, wherein the first transform of the first image is in a same domain as the first image m.

11. The method of claim 1, wherein the first transform of the first image is in a domain different from the first image m.

12. The method of claim 1, further comprising:
splitting the seismic d or the first image m into subsets, and calculating plural pre-stack images $p_i$ corresponding to the subsets;
stacking a selected pre-stack range from the pre-stack images $p_i$ to generate a stack image s;
de-migrating the stack image s and migrating an output of the de-migrating to produce pre-stack re-migrated images $n_i$;
calculating the matching operator F by matching the pre-stack re-migrated images $n_i$ with the stack image s; and
applying the matching operator F to the pre-stack images $p_i$ to obtain updated pre-stack images.

13. The method of claim 1, wherein at least one of the first and second images is denoised prior to calculating the matching operator F.

14. A computing device for generating an image of a subsurface explored by a seismic survey based on least square migration and image de-convolution using a matching operator F, the computing device comprising:
an interface for receiving seismic data d acquired for the subsurface during the seismic survey; and
a processor connected to the interface and configured to,
compute a first image m of the subsurface based on the seismic data d;
compute a second image h of the subsurface based on the first image m;
apply a transform operation to the first and second images m and h to obtain a first transform of the first image and a second transform of the second image;
calculate the matching operator F by matching the first transform of the first image to the second transform of the second image; and
generate an updated image $m^{updated}$ of the subsurface based on the matching operator F and the first transform of the first image
wherein the updated image of the subsurface is useable to determine whether oil and/or gas reservoirs are present in the subsurface.

15. The computing device of claim 14, wherein the transform operation is a dip decomposition.

16. The computing device of claim 15, wherein the dip decomposition decomposes the first and second images m and h, in an image domain, according to dip volumes $V_i$ of the subsurface, the first transform of the first image is a first dip decomposed image $m_i$, the second transform of the second image is a second dip decomposed images $h_i$, where "i" is an index, and the processor is further configured to:
calculate different matching operators $F_i$ for each pair of the first and second dip decomposed images $m_i$ and $h_i$ that have the same index i.

17. The computing device of claim 16, wherein the processor is further configured to:
calculate an updated image component $m^{updated}_i$ for each pair of first and second dip decomposed images $m_i$ and $h_i$ that have the same index i by applying the different matching operator $F_i$ to a corresponding first dip decomposed image $m_i$.

18. The computing device of claim 17, wherein the processor is further configured to:
construct the updated image $m^{updated}$ using the updated image components $m^{updated}_i$ corresponding to dip volumes $V_i$.

19. The computing device of claim 14, wherein the processor is further configured to:
apply a demigration operator L to the first image m followed by applying a migration operator $L^H$, wherein the migration operator is an adjoint of the demigration operator,
wherein the demigration operator L and the migration operator $L^H$ transform an object from an image space to a data space and vice versa, respectively.

20. A non-transitory computer readable medium including computer executable instructions, wherein the instructions, when executed by a processor, implement instructions for generating an image of a subsurface explored by a seismic survey based on least square migration and image de-convolution using a matching operator F, the instructions controlling the processor to:
receive seismic data d acquired for the subsurface during the seismic survey;
compute a first image m of the subsurface based on the seismic data d;
compute a second image h of the subsurface based on the first image m;
apply a transform operation to the first and second images m and h to obtain a first transform of the first image and a second transform of the second image;
calculate the matching operator F by matching the first transform of the first image to the second transform of the second image; and
generate an updated image $m^{updated}$ of the subsurface based on the matching operator F and the first transform of the first image,
wherein the updated image of the subsurface is useable to determine whether oil and/or gas reservoirs are present in the subsurface.

* * * * *